Figure 1:
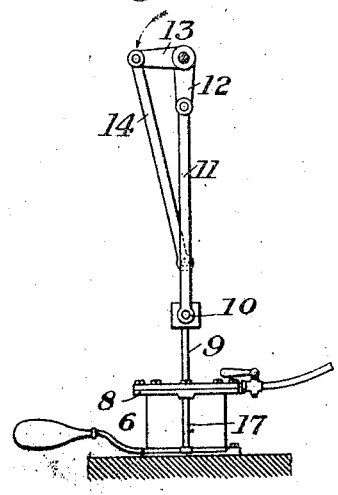

No. 827,679. PATENTED JULY 31, 1906.
F. L. O. WADSWORTH.
APPARATUS FOR SHAPING GLASS.
APPLICATION FILED AUG. 16, 1905.

2 SHEETS—SHEET 1.

WITNESSES
R. A. Balderson.
Warren W. Swartz

INVENTOR
Frank L. O. Wadsworth

No. 827,679. PATENTED JULY 31, 1906.
F. L. O. WADSWORTH.
APPARATUS FOR SHAPING GLASS.
APPLICATION FILED AUG. 16, 1905.

2 SHEETS—SHEET 2.

WITNESSES
R A Balderson
Warren W. Swartz

INVENTOR
Frank L. O. Wadsworth

UNITED STATES PATENT OFFICE.

FRANK L. O. WADSWORTH, OF MORGANTOWN, WEST VIRGINIA.

APPARATUS FOR SHAPING GLASS.

No. 827,679.    Specification of Letters Patent.    Patented July 31, 1906.

Original application filed June 10, 1903, Serial No. 160,876. Divided and this application filed August 16, 1905. Serial No. 274,394.

*To all whom it may concern:*

Be it known that I, FRANK L. O. WADSWORTH, of Morgantown, Monongalia county, West Virginia, have invented a new and useful Apparatus for Shaping Glass, of which the following is a full, clear, and exact description, reference being had to the accompanying drawings, forming part of this specification.

The present application is a division of my Patent No. 789,642, granted September 5, 1905, the application for which was filed June 10, 1903.

The purpose of my invention is to provide means for producing on glass articles a better surface and figures of more accurate outline than has been produced heretofore on articles pressed or molded in the ordinary way and also to control the glass during and after its shaping in the molding or rolling apparatus.

In the ordinary methods of rolling and pressing glass it frequently happens that small bubbles of air and particles of dust and other foreign substances are trapped between the molding-surface and the glass, and although they may be small they produce irregularities of surface which mar the glass and prevent it from taking the form desired. Like defects are produced by gases which are liberated from the hot surface of the mold or rolling apparatus.

My invention avoids these difficulties by providing means for creating a vacuum between the glass and the molding or rolling surface and withdrawing the gases and particles of dust, so that the glass comes into perfect contact with the molding or rolling apparatus and a perfectly clean bright surface is produced.

My invention may be used in the forms shown in the drawings, which illustrate its principle and will enable those skilled in the art to apply it in the manufacture of many kinds of glass articles.

Figure 2:
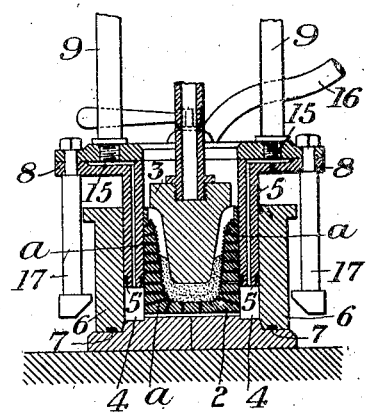
Figure 4:
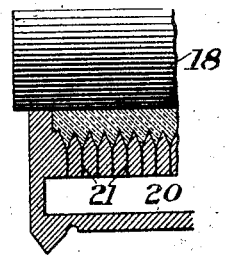
Figure 3:
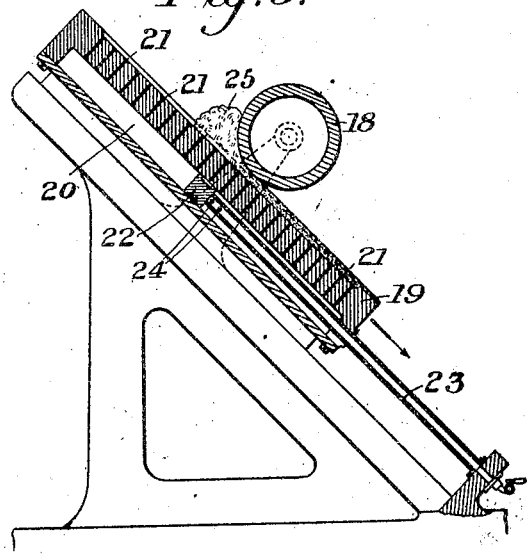
Figure 9:
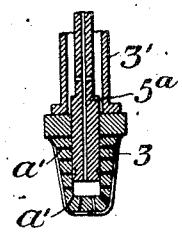
Figure 5:
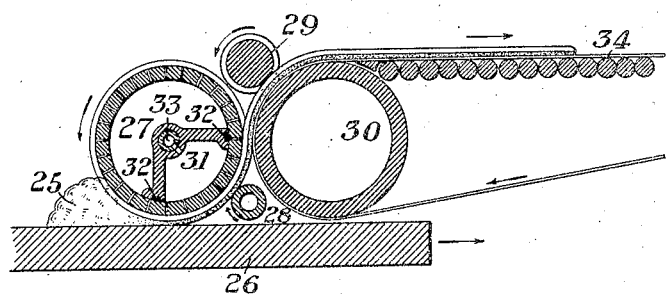
Figure 6:
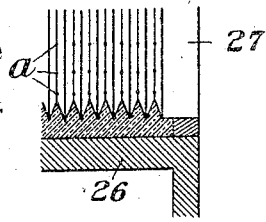
Figure 8:
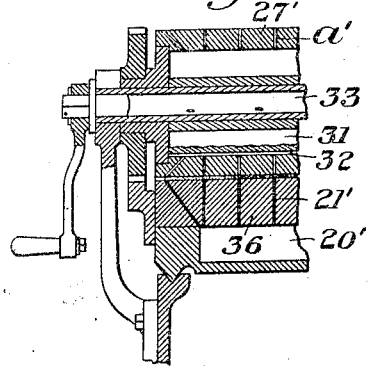
Figure 7:
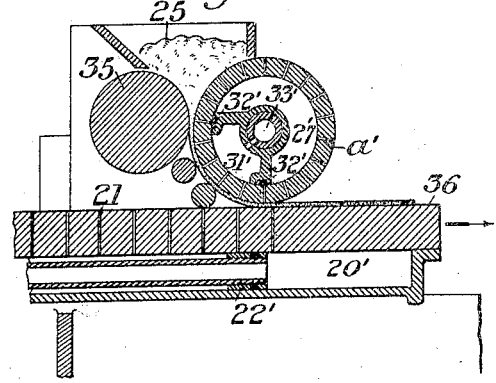

In the accompanying drawings, Figure 1 is a side elevation of a glass-press equipped with means for the practice of my invention. Fig. 2 is a vertical section of the mold on a larger scale. Fig. 3 is a vertical section of glass-rolling apparatus adapted to the practice of my invention. Fig. 4 is a sectional view of part of the table and of the roll on a larger scale. Fig. 5 is a longitudinal section of other rolling apparatus for rolling prism-glass with the use of my invention. Fig. 6 is a cross-section of part of the table of Fig. 5, showing the grooved roll in elevation. Fig. 7 is a longitudinal section of apparatus for rolling plain sheet-glass with the use of my invention, and Fig. 8 is a vertical cross-section of the apparatus shown in Fig. 7. Fig. 9 shows a modified plunger.

In Figs. 1 and 2 I show my invention as applied to the manufacture of hollow pressed-glass articles. 2 is the mold, whose interior has the shape desired for the finished article and is formed with a pattern to be impressed on the glass. Air-passages *a* lead from its interior surface to an exterior chamber 4. 3 is the plunger, and 5 is a piston which enters the chamber 4 and is provided with suitable surface packing 5'. The chamber 4 is preferably constituted by a metal ring 6, which is seated on the base of the mold, being provided with suitable air-tight packing 7. The mold 2 may be made of hinged sections, which are closed tightly together when they are surrounded by the piston 5 and ring 6. The piston 5 is carried by a head 8, having standards 9 connected by a cross-head 10 and links 11 to a crank 12. A second crank 13 is set on the shaft of the crank 12, preferably at ninety degrees therefrom, and is connected by a link 14 to the stem 3' of the plunger 3. The piston 5 is traversed by air-passages which lead from an air-chamber 15 at the upper end of the piston and are connected thereby to the pipe 16 of suitable air-exhausting apparatus. (Not shown.) The plunger 3 may also be provided with piston 5ᵃ and air-passages *a*,' like those of the mold, as shown in Fig. 9, the stem 3' in such case being hollow and connected with air-exhausting apparatus.

In operating the device shown in Figs. 1 and 2 the ring 6 is placed around the mold, so as to form the chamber 4, and the cranks 12 and 13 are set in the position shown in Fig. 1, so that the piston 5 is brought to its lowest position in the chamber 4, while the plunger 3 is still elevated. A gathering of glass is then placed in the mold and the cranks operated in the direction shown by the arrow. As the plunger descends into the mold the piston 5 simultaneously rises, successively uncovering the openings *a*. The connection between the piston and the air-exhausting apparatus is maintained during this operation so that as the glass is pressed within the mold the rising of the piston creates a vacuum between the glass and the mold, exhausts therefrom all air, gases, and particles of dust, as above explained, and permits the glass to be forced into an intimate and perfect contact with the mold. When the plunger 3 has reached the end of its downstroke, the piston 5 will have reached the top of the mold, and then as the rotation of the cranks is continued both the piston and the plunger rise and during the next ninety degrees of the travel of the crank 12 hangers 17 on the head 8 engage the ring 6 and lift it from the mold, leaving the latter free to be opened for the removal of the glass article.

When it is desired to apply my invention to the shaping of the interior of the article, the plunger is made hollow and connected with the air-exhausting apparatus, as above explained.

In Figs. 3 and 4 I show my invention applied to the rolling of glass sheets having a figured under face. 18 is the roll, and 19 is a table which may be set in an inclined position, as shown, and is adapted to travel beneath the roll. The table has a vacuum-chamber 20, provided with openings 21, extending to the front surface. 22 is a piston whose hollow stem 23 is connected to air-exhausting apparatus and communicates by openings 24 with the vacuum-chamber. The table moves longitudinally in suitable slideways, and in Fig. 3 is shown in the middle position.

When the table is in its initial elevated position, a body of glass 25 is placed upon it in front of the roll, and the table is then caused to move in the direction of the arrow. As it travels under the roll the glass is flattened into sheet form, being pressed by the roll into the figured surface of the table, and the air-openings 21 are successively uncovered by the piston and put into communication with the vacuum-chamber 20, so that as the glass sheet is formed it is at once subjected to the action of the vacuum, which removes intervening gases, air, or solid particles. The sheet is maintained by atmospheric pressure in contact with the table until the glass is set.

In all the modifications of my invention the glass is subjected to a difference of pneumatic pressure on its opposite faces and is thus pressed pneumatically simultaneously with the pressing which is effected by the surfaces of the rolls or plungers.

In Figs. 5 and 6 I show other apparatus adapted to roll figured glass sheets, the figured pattern being in this case upon the roll and being thus applied to the upper surface of the sheet. In these figures, 26 is the table, which is adapted to move in the direction of the arrow, 27 is a hollow forming-roll mounted above the table, and 28, 29, and 30 are guide-rollers for the glass sheet. Within the hollow roll is a stationary box 31, having its ends in contact with the inner surface of the roll and provided with packing material 32. This box is connected at 33 with air-exhausting apparatus, and it constitutes within the roll a chamber occupying about one-quarter of the circumference of the roll in which a partial vacuum is maintained during the rolling operation.

The mass of glass 25 to be rolled is placed on the table 26 back of the roll, and as the table advances it is pressed thereby against the figured surface of the roll and assumes the form of a sheet which is carried by the roll and by the guide-rollers onto a conveying-belt 34 and thence to the annealing-furnace. As the sheet is being formed it is subjected to the vacuum within the chamber 31, and the air-pressure on the opposite side of the chamber holds it in contact with the roll until it has passed beyond the box 31 and has been engaged by the guiding-roller 30. This enables me to lift the sheet from the table as it is formed and to carry it upward.

In Figs. 7 and 8 I show my invention adapted to the forming of glass sheets by the action of two rolls, between which glass is passed. One of these rolls 27' is constructed in like manner as the roll 27 of Fig. 5 and with similar interior parts which I have marked with like reference-figures distinguished by the prime-mark, (′.)

The body of glass 25 is placed between the roll 27' and a second forming-roll 35 and is rolled thereby into a sheet, which as it is formed is drawn closely against the surface of the roller 27' and is held against the same by air-pressure until it is delivered upon the surface of a receiving-table 36. This table may travel in the direction of the arrow and may be constructed like the table shown in Fig. 3, so that as the glass is deposited upon it it will be drawn down by the air-pressure and flattened perfectly into sheet form.

The advantages of my invention will be appreciated by those skilled in the art. It produces molded or rolled glass articles of finer surface than has been possible heretofore, and the facility which it affords for the handling of the product in the machine is of importance.

I claim—

1. Apparatus for forming glass articles, having compressing-surfaces between which the final shape is imparted to the article, and air-passages leading from at least one of said surfaces to an exhaust mechanism and arranged to communicate successively therewith and only after they have been covered by the glass under the action of the compressing-surfaces; substantially as described.

2. Apparatus for forming glass articles having compressing-surfaces between which the glass is shaped, an air-exhausting mechanism extending from one at least of said surfaces and communicating with said surfaces through perforations, and means for opening the perforations successively as they are covered by the article being formed; substantially as described.

3. A glass-rolling table, having its forming-face communicating through perforations to an air-exhausting mechanism and means whereby communication is made successively through such perforations with said mechanism; substantially as described.

4. A glass-rolling table, having its forming-face communicating through perforations to an air-exhausting mechanism, a roll, and a cover for said perforations coacting with the roll and constructed to open communication between the perforations and the air-exhausting mechanism as the perforations are covered by the sheet being rolled; substantially as described.

In testimony whereof I have hereunto set my hand.

FRANK L. O. WADSWORTH.

Witnesses:
  G. M. VIERS,
  H. M. CORWIN.